(12) United States Patent
Chang

(10) Patent No.: US 8,015,334 B2
(45) Date of Patent: Sep. 6, 2011

(54) POWER-ON SIGNAL TRANSMITTING SYSTEM AND POWER-ON SIGNAL TRANSMITTING METHOD

(75) Inventor: Chao-Cheng Chang, Jhudong Township, Hsinchu County (TW)

(73) Assignee: Promise Technology, Inc., Hsin-chu (TW)

( * ) Notice: Subject to any disclaimer, the term of this patent is extended or adjusted under 35 U.S.C. 154(b) by 304 days.

(21) Appl. No.: 12/457,999

(22) Filed: Jun. 29, 2009

(65) Prior Publication Data

US 2010/0207461 A1    Aug. 19, 2010

(30) Foreign Application Priority Data

Feb. 17, 2009  (TW) .............................. 98104993 A

(51) Int. Cl.
*G06F 13/00* (2006.01)
*G05B 13/02* (2006.01)
*H02J 3/00* (2006.01)

(52) U.S. Cl. ............................ 710/100; 700/40; 307/41

(58) Field of Classification Search .................... 307/41; 340/2.1, 4.34; 700/40, 75; 710/38, 10, 100
See application file for complete search history.

(56) References Cited

U.S. PATENT DOCUMENTS 6,065,079 A * 5/2000 Dupuy ........................ 710/305

* cited by examiner

*Primary Examiner* — Michael Rutland Wallis

(57) ABSTRACT

The invention discloses a power-on signal transmitting system, which includes a first electronic device, a second electronic device and a cable coupled between the two electronic devices. The first electronic device includes a power-on control unit. The second electronic device includes a power-on detection unit. The cable includes at least one information wiring and a signal level wiring. The at least one information wiring is used for transmitting an information signal between the first electronic device and the second electronic device. When the second electronic device is at a power-off state, the power-on control unit of the first electronic device is used for transmitting a power-on signal through the signal level wiring to the second electronic device. The power-on detection unit senses the power-on signal and turns on the second electronic device.

9 Claims, 4 Drawing Sheets

POWER-ON SIGNAL TRANSMITTING SYSTEM AND POWER-ON SIGNAL TRANSMITTING METHOD

BACKGROUND OF THE INVENTION

1. Field of the Invention

The invention relates to a power-on signal transmitting system and a power-on signal transmitting method and, more particularly, to a power-on signal transmitting system and a power-on signal transmitting method capable of utilizing an idle wiring to transmitting a power-on signal.

2. Description of the Prior Art

In the information exchange process between electronic devices, designers and users are always seeking for lower cost, higher speed and better stability from the information exchange. In practical applications, we try to elevate the usage efficiency of the signal cable with all possibilities, and to maintain the quality of service (QoS) of the signal exchange at the same time.

There are several kinds of cables serving as the medium of the signal exchange between electronic devices. For example, coaxial cable, Small Computer System Interface (SCSI) cable, Serial Attached SCSI (SAS) cable, Advanced Technology Attachment (ATA) cable, Serial ATA (SATA) cable and High Definition Multimedia Interface (HDMI) cable are able to function in applications of communication, video on demand (VOD) and digital information computing. That to utilize these cables in information transmitting has its advantages of low cost, stability and adaptability to different purposes.

Please refer to FIG. 1 and FIG. 2. FIG. 1 is a schematic diagram illustrating a signal transmitting system 1 between electronic devices in prior art. FIG. 2 is a schematic diagram illustrating a wiring allocation of a signal cable 14 in FIG. 1. As shown in FIG. 1, the signal transmitting system 1 comprises an electronic device 10, an electronic device 12 and a signal cable 14. For example, the electronic device 10 can be a control unit of a personal computer, and the electronic device 12 can be a CD-ROM drive. Because there are demands for signal exchanging between the electronic device 10 and the electronic device 12, the cable 14 is used for forming a coupling relationship between the electronic device 10 and the electronic device 12.

The electronic device 10 has a signal process unit 100. On the other hand the electronic device 12 has a signal process unit 120. These two signal process units (100, 120) are used for handling, receiving, transmitting and converting messages between the electronic device 10 and the electronic device 12.

The cable 14 includes a plurality of wirings corresponding to demands for signal exchanging between the control unit of the PC and the CD-ROM drive in this case. The cable 14 in FIG. 2, for example, is a Mini SAS 4X cable. Following the definition of pin order, the cable 14 includes wirings PINA1~PINA13 (from the electronic device 12 to the electronic device 10) and wirings PINB1~PINB13 (from the electronic device 10 to the electronic device 12).

Take the wiring PINB1, the wiring PINB2 and the wiring PINB3 for demonstration. The wiring PINB2 and the wiring PINB3 form a differential pair of information wirings, for transmitting an information signal from the electronic device 10 to the electronic device 12. The wiring PINB1 is used for providing a reference level corresponding to the differential information signal via the wiring PINB2 and the wiring PINB3. In other word, the wiring PINB1 is a reference wiring corresponding to the wiring PINB2 and the wiring PINB3.

However, the electronic device 12 (e.g. CD-ROM) is not always at a power-on state. In some cases, the electronic device 12 is off by default. When a user operates the electronic device 10 (e.g. PC) and he needs the function from the electronic device 12, a power-on signal must be transmitted by the electronic device 10 to the electronic device 12, for activating and enabling the electronic device 12.

In this embodiment, the information wirings of the wiring PINB2 and the wiring PINB3 can be assigned to connect with a power-on signal generator for exclusively transmitting the power-on signal. However, the wiring PINB2 and the wiring PINB3 are limited to transmit only the power-on signal in this case. Therefore, after the electronic device 12 is power-on, the wirings (PINB2 and PINB3) are going to be idle during the power-on period of the electronic device 12, such that the efficiency of the wiring usage is decreased.

In another embodiment, the information wirings of the wiring PINB2 and the wiring PINB3 can be assigned to connect with the signal process unit 100 and the power-on signal generator at the same time. It utilizes the single pair of the wiring PINB2 and the wiring PINB3 to achieve two goals, which are to transmit the information signal and to transmit the power-on signal. However, the demands for the quality of the signal are elevated nowadays. The information signal is usually transmitted at a high-frequency with precisely low amplitude. Therefore, even though it can maintain the efficiency by inserting a fork circuit on the wirings (PINB2, PINB3) for branch-connecting to the power-on signal generator, but on the other hand it sacrifices the quality of the information signal through the wirings (PINB2, PINB3) as trade-off.

The invention discloses a power-on signal transmitting system and a power-on signal transmitting method, to solve aforesaid problems.

SUMMARY OF THE INVENTION

A scope of the invention is to provide a power-on signal transmitting system, which comprises a first electronic device, a second electronic device and a cable.

According to an embodiment of the invention, the first electronic device includes a power-on control unit. The second electronic includes a power-on detection unit. The cable includes at least one information wiring and a signal level wiring. The at least one information wiring is coupled between the first electronic device and the second electronic device. The signal level wiring is coupled to the power-on control unit and the power-on detection unit respectively. The at least one information wiring is used for transmitting an information signal between the first electronic device and the second electronic device.

When the electronic device is at a power-on state, the signal level wiring is used for providing a first reference level. When the second electronic device is at a power-off state, the power-on control unit of the first electronic device is used for sending a power-on signal to the second electronic device through the signal level wiring of the cable. The power-on detection unit of the second electronic device senses the power-on signal and switches the second electronic device from the power-off state to the power-on state.

Another scope of the invention is to provide a power-on signal transmitting method. The power-on signal transmitting method is suitable for an electronic system. The electronic system includes a first electronic device, a second electronic device and a cable. The cable includes at least one information wiring and a signal level wiring. The at least one information wiring is used for transmitting an information signal between the first electronic device and the second electronic device. When the second electronic device is at a power-on state, the signal level wiring is used for providing a first reference level corresponding to the information signal.

According to an embodiment of the invention, the power-on signal transmitting method comprising steps of: (a) when the second electronic device is at a power-off state, utilizing the signal level wiring of the cable to send a power-on signal from the first electronic device to the second electronic device; and (b) sensing the power-on signal and turning on the second electronic device.

Another scope of the invention is to provide a power-on signal transmitting system, which includes a first electronic device, a second electronic device and a cable.

According to an embodiment of the invention, the first electronic device includes a first power-on control unit and a first power-on detection unit. The second electronic device includes a second power-on control unit and a second power-on detection unit. The cable includes at least one information wiring and a signal level wiring. The at least one information wiring is coupled between the first electronic device and the second electronic device. The signal level wiring is coupled to the first power-on control unit, the first power-on detection unit, the second power-on control unit and the second power-on detection unit respectively. The at least one information wiring is used for transmitting an information signal between the first electronic device and the second electronic device.

When the first electronic device and the second electronic device are both at a power-on state, the signal level wiring is used for providing a first reference level. When the second electronic device is at a power-off state, the first power-on control unit of the first electronic device is used for sending a first power-on signal to the second power-on detection unit of the second electronic device through the signal level wiring, so as to turn on the second electronic device. On the other hand, when the first electronic device is at the power-off state, the second power-on control unit of the second electronic device is used for sending a second power-on signal to the first power-on detection unit of the first electronic device through the signal level wiring, so as to turn on the first electronic device.

Compared with prior art, the power-on signal transmitting system and the power-on signal transmitting method of the invention is based on that the signal level wiring of the cable is idle while one electronic device in the power-on signal transmitting system is power-off. Accordingly, the power-on signal transmitting system of the invention sends the power-on signal through the signal level wiring, which is idle when the electronic device is off. Once the electronic device is turned on, the signal level wiring is reset to provide the reference level corresponding to the information signal. Therefore, it does not occupy exclusive information wiring to transmit the power-on signal. On the other hand, it also provides better quality of the signal, because that the information wirings are not shared by the power-on signal and other information signals at the same time. Accordingly, the power-on signal transmitting system and the power-on signal transmitting method of the invention, which need no extra wirings, may utilize the idle period of the origin wirings to control an on/off state of the electronic devices.

The advantage and spirit of the invention may be understood by the following recitations together with the appended drawings.

BRIEF DESCRIPTION OF THE APPENDED DRAWINGS

DETAILED DESCRIPTION OF THE INVENTION

Figure 1:
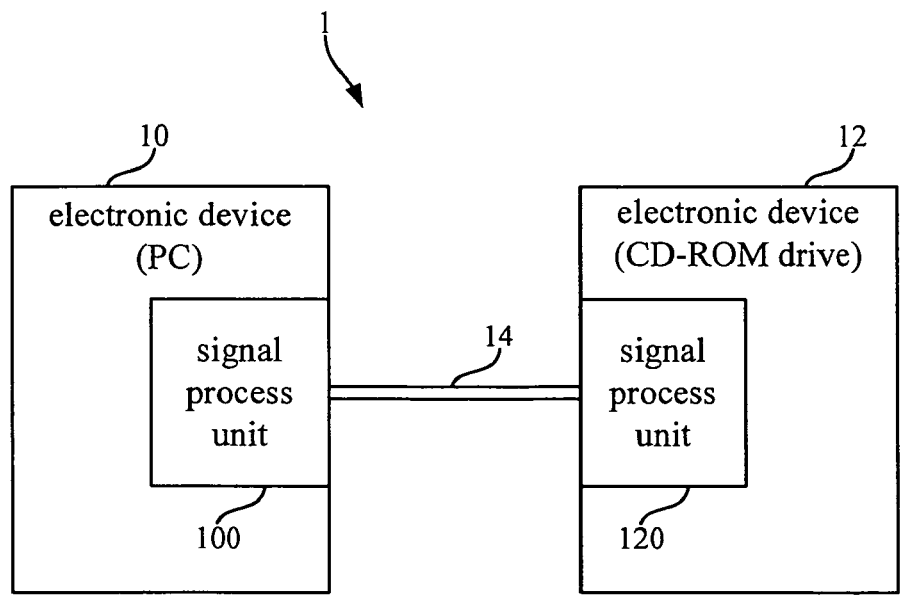
FIG. 1 is a schematic diagram illustrating a signal transmitting system between electronic devices in prior art.
Figure 2:
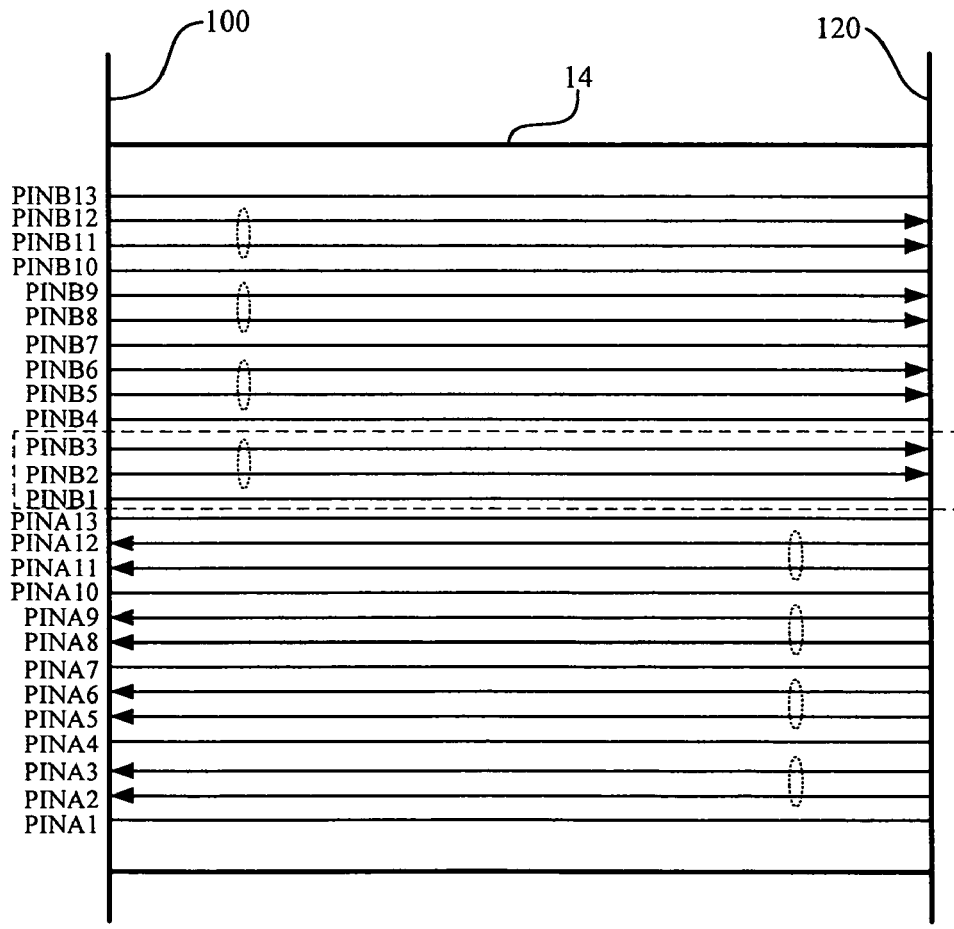
FIG. 2 is a schematic diagram illustrating a wiring allocation of a signal cable in FIG. 1.
Figure 3:
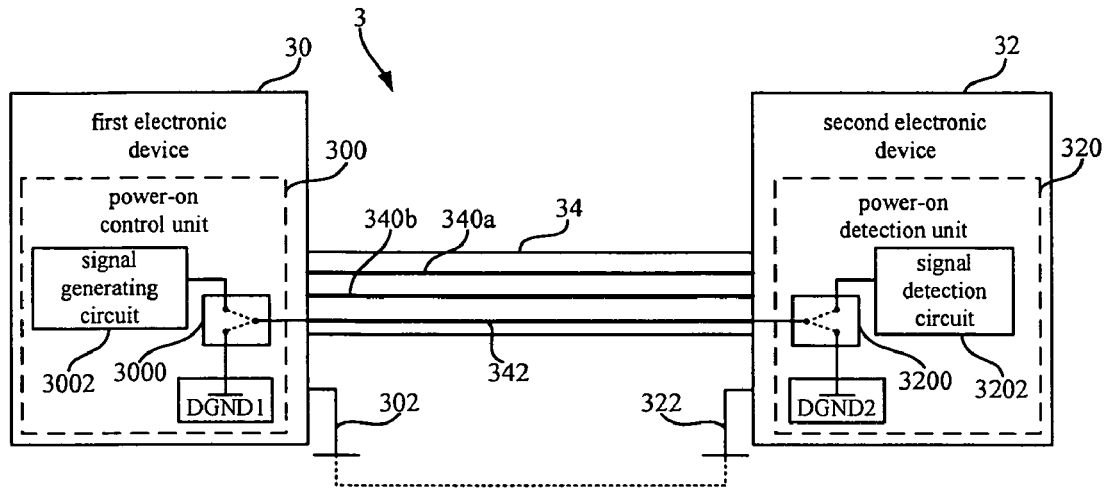
FIG. 3 is a schematic diagram illustrating a power-on signal transmitting system according a first embodiment of the invention.

Please refer to FIG. 3. FIG. 3 is a schematic diagram illustrating a power-on signal transmitting system 3 according a first embodiment of the invention. As shown in FIG. 3, the power-on signal transmitting system 3 includes a first electronic device 30, a second electronic device 32 and a cable 34. The cable 34 is coupled between the first electronic device 30 and the second electronic device 32. The cable 34 serves as the medium of the signal exchange between two electronic devices. In the embodiment, the electronic device 30 can control the on/off state of the second electronic device 32 through the cable 34. The detail operations for switching the on/off state are disclosed as below.

The first electronic device 30 includes a power-on control unit 300. The second electronic 32 includes a power-on detection unit 320. The cable 34 includes an information bus and a signal level bus.

In this embodiment, the information bus of the cable 34 includes an information wiring 340a and an information wiring 340b. The information wiring 340a and the information wiring 340b can be used to transmit an information signal in a differential way between the first electronic device 30 and the second electronic device 32. However, the invention is not limited to have a differential pair like the information wiring 340a and the information wiring 340b.

In the embodiment, the signal level bus of the cable 34 includes a signal level wiring 342. As shown in FIG. 3, the signal level wiring 342 is coupled to the power-on control unit 300 of the first electronic device 30 and the power-on detection unit 320 of the second electronic device 32 respectively.

Figure 4A:
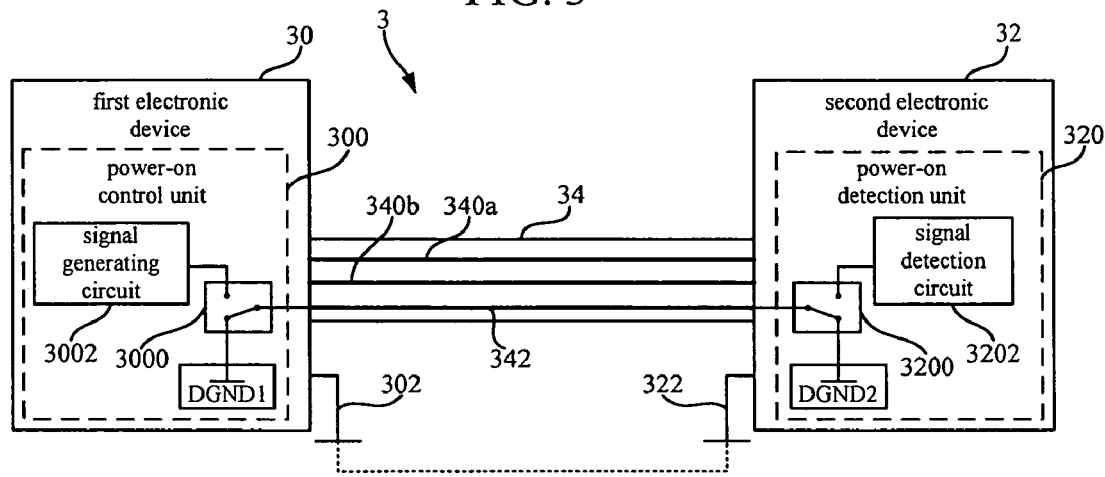
FIG. 4A is a schematic diagram illustrating the power-on signal transmitting system and the cable in FIG. 3 during the information transmitting period.

Please refer to FIG. 4A as well. FIG. 4A is a schematic diagram illustrating the power-on signal transmitting system 3 and the cable 34 in FIG. 3 during the information transmitting period.

When two electronic devices are active and exchanging the information signal via the information bus, it needs an identical reference level to serve as a reference point corresponding to the amplitude of the information signal, further to improve the quality of the information signal.

In the embodiment, the signal level bus of the cable 34 includes the signal level wiring 342. The power-on control unit 300 of the first electronic device 30 includes a switch circuit 3000 and a signal generating circuit 3002. The power-on detection unit 320 of the second electronic device 32 includes another switch circuit 3200 and a signal detection circuit 3202.

When the second electronic 32 is at the power-on state (i.e. two electronic devices are exchanging the information signal), the switch circuit 3000 is used for coupling one end of the signal level wiring 342 to a digital ground DGND1 of the first electronic device 32. At the same time, the switch circuit 3200 is used for coupling the other end of the signal level wiring 342 to another digital ground DGND2 of the second electronic device 32. Accordingly, the digital ground DGND1 and the digital ground DGND2 are electrically connected through the signal level wiring 342 for providing the reference level corresponding to the information signal.

It means that, when the information signal bus is active and transmitting the information signal, the signal level wiring 342 is used for providing the reference level corresponding to the information signal, such that it can improve the signal sampling between the first electronic device 30 and the second electronic device 32, and it can also reduce the influence from the electromagnetic interference (EMI).

It is important that, in the embodiment, the structure of wiring allocation (the information wiring 340*a*, the information wiring 340*b* and the signal level wiring 342) is a possible allocation of the cable 34, but the invention is not limited to this allocation. In practical application, the number of wirings of the cable 34 depends on the practical demands. For example, the cable may include one or more information wirings, not limited to one differential pair. Besides, the number of the signal level wirings may correspond to the practical amount of the information wirings as well. In other words, if there is enough space, the cable 34 of the invention may include singular information wiring with singular signal level wiring, multiple information wirings with singular signal level wiring, or multiple information wirings with multiple signal level wirings. The cable 34 of the invention can be, for example, Mini SAS 4x cable, which includes sixteen information wirings (eight differential pairs) and ten signal level wirings, but not limited to this. The cable 34 may also be coaxial cable, Small Computer System Interface (SCSI) cable, Serial Attached SCSI (SAS) cable, Advanced Technology Attachment (ATA) cable, Serial ATA (SATA) cable or High Definition Multimedia Interface (HDMI) cable.

Figure 4B:
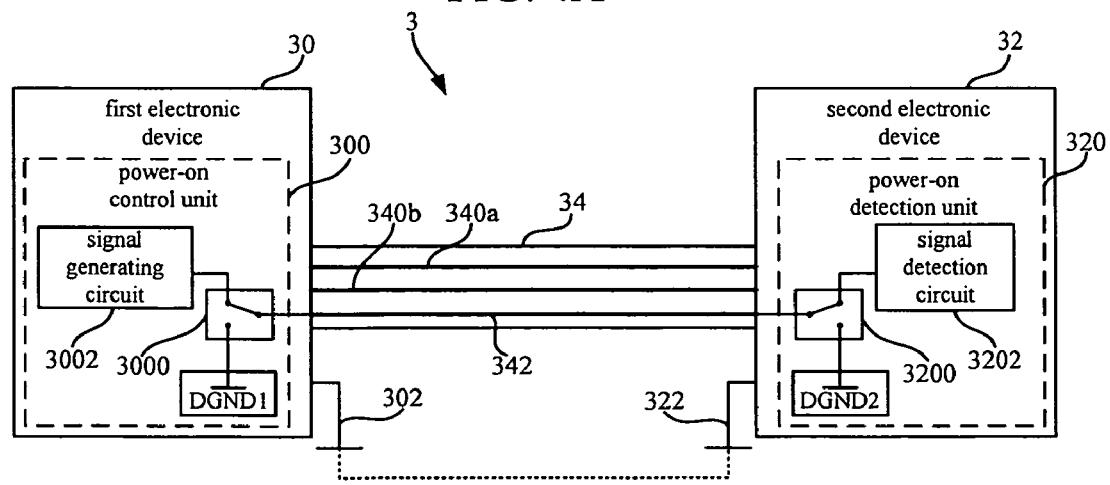
FIG. 4B is a schematic diagram illustrating the power-on signal transmitting system and the cable when the power-on signal is transmitted.

Please refer to FIG. 4B as well. FIG. 4B is a schematic diagram illustrating the power-on signal transmitting system 3 and the cable 34 when the power-on signal is transmitted.

When the second electronic device 32 is at the power-off state, the switch circuit 3000 is switched to couple one end of the signal level wiring 342 to the signal generating circuit 3002 of the first electronic device 30. The switch circuit 3200 is also switched to couple the other end of the signal level wiring 342 to the signal detection circuit 3202 of the second electronic device 32.

The signal generating circuit 3002 may respond to a user manipulation or a system order and selectively generate the power-on signal, which is transmitted to the signal detection circuit 3202 through the signal level wiring 342. The power-on detection unit 3202 of the second electronic device 32 senses the power-on signal and switches the second electronic device 32 from the power-off state to the power-on state. For example, the user may manipulate a specific button (no shown in figures) to generate the power-on signal for turning on the second electronic device 32, or in another case, the first electronic device 30 may automatically generate the power-on signal according the system demand for turning on the second electronic device 32.

Besides, the first electronic device 30 in the embodiment may further include a grounding wiring 302, and the second electronic device 32 may further include another grounding wiring 322. The grounding wiring 302 and the grounding wiring 322 are coupled to earth respectively, such that an earth-ground loop is formed. When the power-on control unit 300 of the first electronic device 30 transmits the power-on signal to the second electronic 32 through the signal level wiring 342, the earth-ground loop is used for providing a reference level corresponding to the power-on signal.

In other words, when the power-on signal is transmitted in FIG. 4B of the embodiment, the reference level corresponding to the power-on signal of the power-on signal transmitting system 3 is provided via the earth-ground loop.

Figure 5:
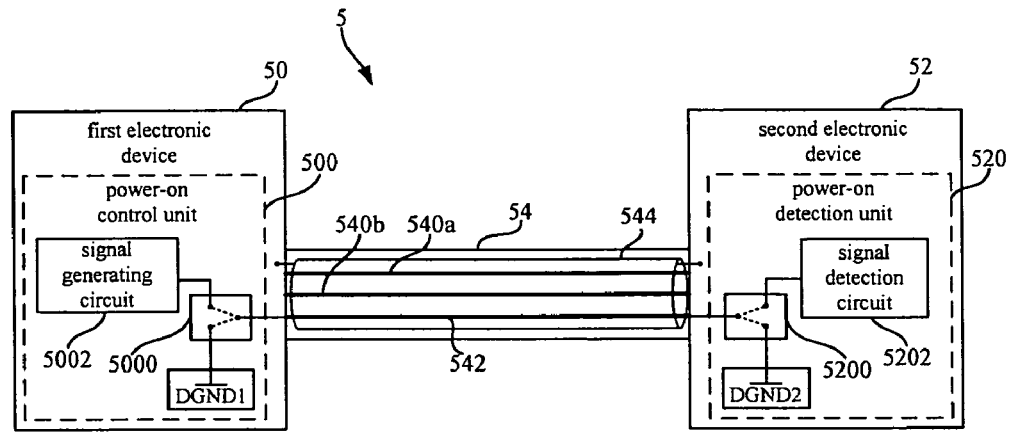
FIG. 5 is a schematic diagram illustrating a power-on signal transmitting system according to a second embodiment of the invention.

Please refer to FIG. 5. FIG. 5 is a schematic diagram illustrating a power-on signal transmitting system 5 according to a second embodiment of the invention. The main difference from the first embodiment is that, the cable 54 of the power-on transmitting system 5 may further include a metal shielding layer 544. The metal shielding layer 544 may be disposed to surround the information wiring 540*a*, the information wiring 540*b* and the signal level wiring 542. The metal shielding layer 544 may be used for protecting and shielding the wirings in the cable 54.

In the embodiment, two ends of the metal shielding layer 544 are electrically connected to the first electronic device 50 and the second electronic device 52 respectively. When the power-on control unit 500 of the first electronic device 50 transmits the power-on signal to the second electronic 52 through the signal level wiring 542, the metal shielding layer 544 is used for providing a second reference level corresponding to the power-on signal. The detail theories and functions of the power-on signal transmitting system 5 are similar to the previous descriptions in the invention, and are not repeated here.

Accordingly, the power-on signal transmitting system of the invention, which needs no extra wirings, may utilize the idle period of the origin wirings to control an on/off state of the electronic devices.

Figure 6:
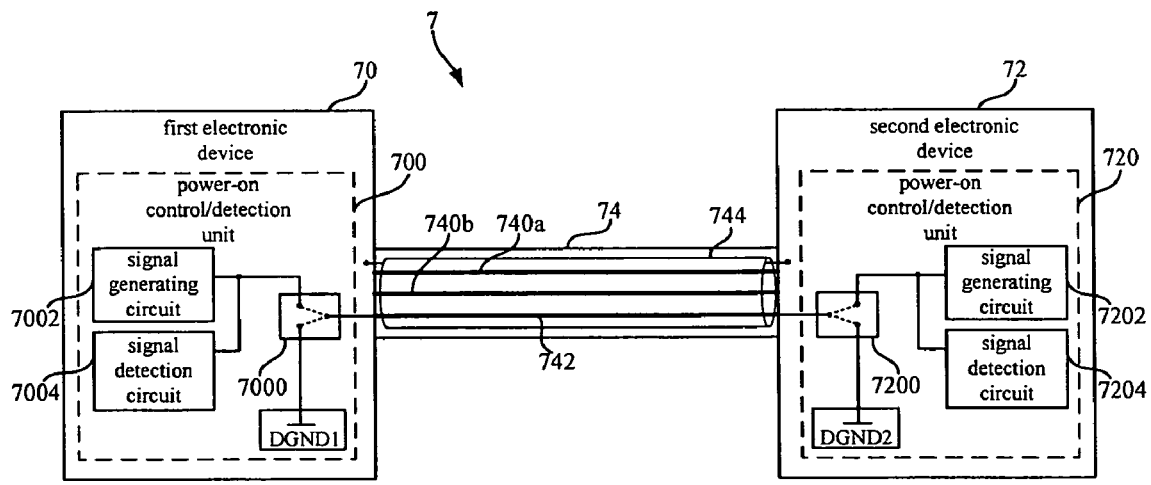
FIG. 6 is a schematic diagram illustrating a power-on signal transmitting system according to a third embodiment of the invention.

Please refer to FIG. 6. FIG. 6 is a schematic diagram illustrating a power-on signal transmitting system 7 according to a third embodiment of the invention. The main difference from the first and the second embodiments is that, the first electronic device 70 in the power-on signal transmitting system 7 includes the power-on control unit and the power-on detection unit at the same time. The second electronic device 72 also includes both of the power-on control unit and the power-on detection unit.

In the embodiment shown in FIG. 6, the power-on control unit and the power-on detection unit of the first electronic device 70 can be formed by a singular power-on control/detection unit 700. The power-on control/detection unit 700 may include a switch circuit 7000, a signal generating circuit 7002 and a signal detection circuit 7004. On the other hand, the power-on control unit and the power-on detection unit of the second electronic device 72 can be formed by another power-on control/detection unit 720. The power-on control/detection unit 720 may include a switch circuit 7200, a signal generating circuit 7202 and a signal detection circuit 7204.

In the embodiment, the power-on control unit and the power-on detection unit of the electronic device can be combined together. In other cases, the power-on control unit and the power-on detection unit can be disposed independently, not limited to the combined implementation in FIG. 6.

The signal level wiring 742 is coupled to the power-on control/detection unit 700 of the first electronic device 70 and the second power-on control/detection unit 720 of the second electronic device 72 respectively.

Accordingly, the first electronic device 70 and the second electronic device 72 may transmit the power-on signal in both directions (from the first electronic device 70 to the second electronic device 72, form the second electronic device 72 to the first electronic device 70), so as control on/off states of each others. The detail theories and functions are similar to the previous descriptions in the invention, and are not repeated here.

Figure 7:
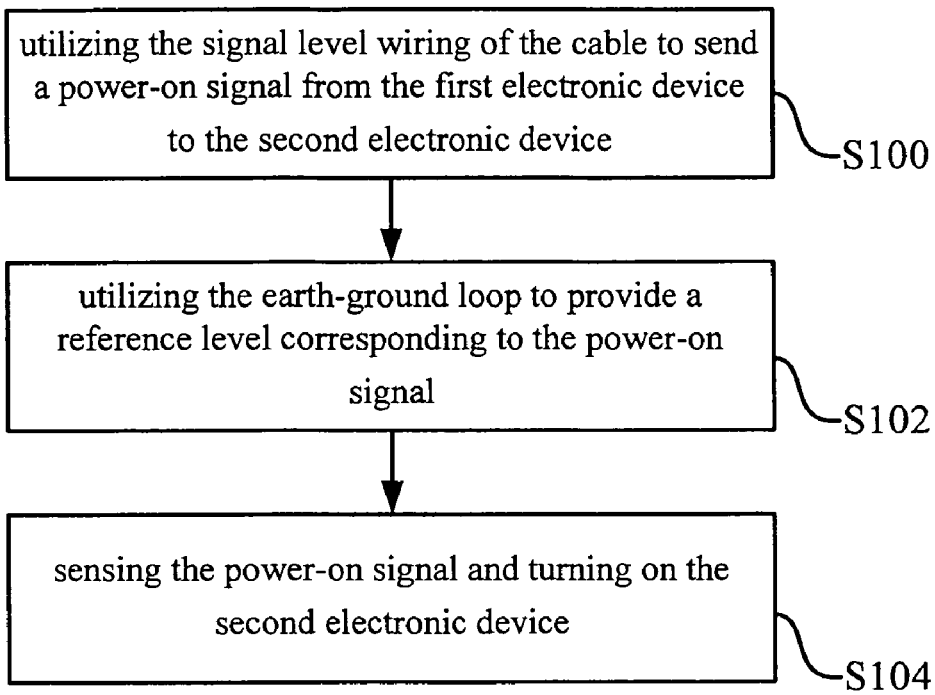
FIG. 7 is a flowchart illustrating a power-on signal transmitting method according to another embodiment of the invention.

Please refer to FIG. 7. FIG. 7 is a flowchart illustrating a power-on signal transmitting method according to another embodiment of the invention. In the embodiment, the power-on signal transmitting method is suitable for an electronic system. The electronic system includes a first electronic device, a second electronic device and a cable.

The cable includes at least one information wiring and a signal level wiring. The at least one information wiring is used for transmitting an information signal between the first electronic device and the second electronic device. When the second electronic device is at a power-on state, the signal level wiring is used for providing a reference level corresponding to the information signal. The first electronic device further includes a first grounding wiring. The second electronic device further includes a second grounding wiring. The first grounding wiring and the second grounding wiring are coupled to earth, such that an earth-ground loop is formed (please refer to FIG. 3).

As shown in FIG. 7, in the power-on signal transmitting method of the embodiment, S100 is performed at first to utilize the signal level wiring of the cable to send a power-on signal from the first electronic device to the second electronic device when the second electronic device is at a power-off state.

When the power-on is transmitted to the second electronic devices, S102 is performed to utilize the earth-ground loop for providing a reference level corresponding to the power-on signal. Afterward, S104 is performed to sense the power-on signal and turn on the second electronic device.

Figure 8:
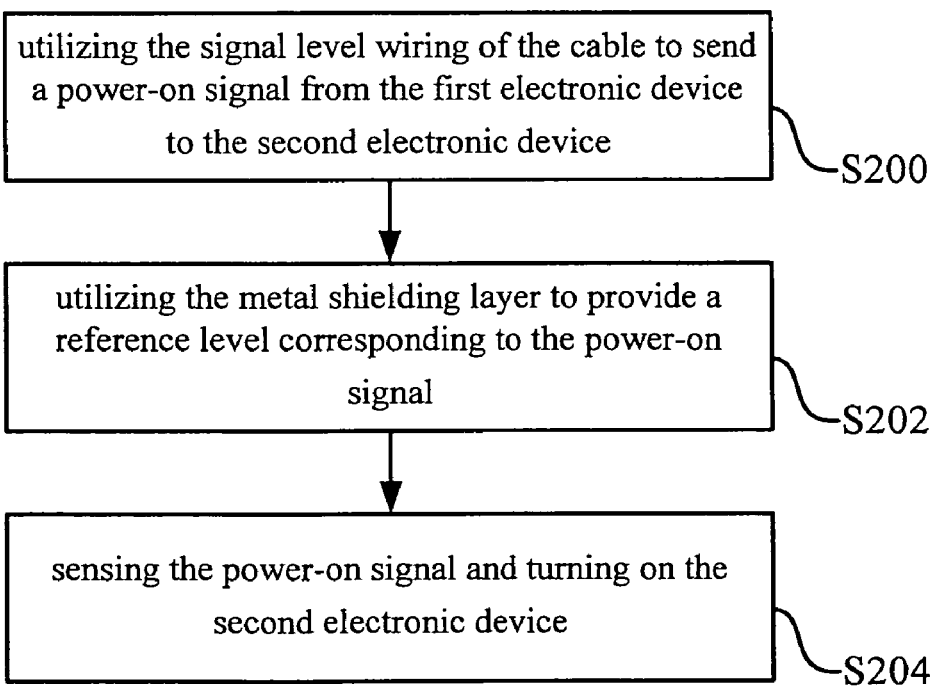
FIG. 8 is a flowchart illustrating a power-on signal transmitting method according to another embodiment of the invention.

Please refer to FIG. 8. FIG. 8 is a flowchart illustrating a power-on signal transmitting method according to another embodiment of the invention. The main difference from the aforesaid embodiment is that, the power-on signal transmitting method in the embodiment is suitable for an electronic system, which the electronic system has a cable further including a metal shielding layer. The metal shielding layer is disposed to surround the at least one information wiring and the signal level wiring. Two ends of the metal shielding layer are electrically connected to the first electronic device and the second electronic device respectively (please refer to FIG. 5).

The difference from the flow in the aforesaid embodiment is that, S202 in this embodiment is performed to utilize the metal shielding layer for providing a reference level corresponding to the power-on signal. Afterward, S204 is performed to sense the power-on signal and turn on the second electronic device.

Compared with prior art, the power-on signal transmitting system and the power-on signal transmitting method of the invention is based on that the signal level wiring of the cable is idle while one electronic device in the power-on signal transmitting system is power-off. Accordingly, the power-on signal transmitting system of the invention sends the power-on signal through the signal level wiring, which is idle when the electronic device is off. Once the electronic device is turned on, the signal level wiring is reset to provide the reference level corresponding to the information signal. Therefore, it does not occupy exclusive information wiring to transmit the power-on signal. On the other hand, it also provides better quality of the signal, because that the information wirings are not shared by the power-on signal and other information signals at the same time.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A power-on signal transmitting system, comprising:
   a first electronic device comprising a power-on control unit;
   a second electronic device comprising a power-on detection unit; and
   a cable comprising:
      at least one information wiring coupled between the first electronic device and the second electronic device, the at least one information wiring being used for transmitting an information signal between the first electronic device and the second electronic device; and
      a signal level wiring coupled to the power-on control unit and the power-on detection unit respectively, the signal level wiring being used for providing a first reference level when the second electronic device is at a power-on state;
   wherein the power-on control unit of the first electronic device is used for sending a power-on signal to the second electronic device through the signal level wiring of the cable when the second electronic device is at a power-off state, the power-on detection unit of the second electronic device sensing the power-on signal and switching the second electronic device from the power-off state to the power-on state.

2. The power-on signal transmitting system of claim 1, wherein the power-on control unit comprises a first switch circuit, the power-on detection unit comprising a second switch circuit, when the second electronic is at the power-on state, the first switch circuit coupling one end of the signal level wiring to a first digital ground of the first electronic device, the second switch circuit coupling the other end of the signal level wiring to a second digital ground of the second electronic device, the first digital ground and the second digital ground being electrically connected through the signal level wiring for providing the first reference level corresponding to the information signal.

3. The power-on signal transmitting system of claim 1, wherein the power-on control unit further comprises a first switch circuit and a signal generating circuit, the power-on detection unit further comprising a second switch circuit and a signal detection circuit, when the second electronic is at the power-off state, the first switch circuit coupling one end of the signal level wiring to the signal generating circuit, the second switch circuit coupling the other end of the signal level wiring to the signal detection circuit, the signal generating circuit being used for generating the power-on signal transmitted to the signal detection circuit through the signal level wiring, so as to turn on the second electronic device.

4. The power-on signal transmitting system of claim 1, wherein the first electronic device further comprises a first grounding wiring, the second electronic device further comprising a second grounding wiring, the first grounding wiring and the second grounding wiring being coupled to earth, such that an earth-ground loop is formed, when the power-on control unit of the first electronic device transmits the power-on signal to the second electronic through the signal level wiring, the earth-ground loop being used for providing a second reference level corresponding to the power-on signal.

5. The power-on signal transmitting system of claim 1, wherein the cable further comprises a metal shielding layer, the metal shielding layer being disposed to surround the at least one information wiring and the signal level wiring, two ends of the metal shielding layer being electrically connected to the first electronic device and the second electronic device respectively, when the power-on control unit of the first electronic device transmits the power-on signal to the second electronic through the signal level wiring, the metal shielding layer being used for providing a second reference level corresponding to the power-on signal.

6. A power-on signal transmitting method, suitable for an electronic system, the electronic system comprising a first electronic device, a second electronic device and a cable, the cable comprising at least one information wiring and a signal level wiring, the at least one information wiring being used for transmitting an information signal between the first electronic device and the second electronic device, when the second electronic device is at a power-on state, the signal level wiring being used for providing a first reference level corresponding to the information signal, the power-on signal transmitting method comprising steps of:
 (a) when the second electronic device is at a power-off state, utilizing the signal level wiring of the cable to send a power-on signal from the first electronic device to the second electronic device; and
 (b) sensing the power-on signal and turning on the second electronic device.

7. The power-on signal transmitting method of claim 6, wherein the first electronic device further comprises a first grounding wiring, the second electronic device further comprising a second grounding wiring, the first grounding wiring and the second grounding wiring being coupled to earth, such that an earth-ground loop is formed, the step (b) further comprising a step of:
 (b1) utilizing the earth-ground loop to provide a second reference level corresponding to the power-on signal.

8. The power-on signal transmitting method of claim 6, wherein the cable further comprises a metal shielding layer, the metal shielding layer being disposed to surround the at least one information wiring and the signal level wiring, two ends of the metal shielding layer being electrically connected to the first electronic device and the second electronic device respectively, the step (b) further comprising a step of:
 (b1) utilizing the metal shielding layer to provide a second reference level corresponding to the power-on signal.

9. A power-on signal transmitting system, comprising:
 a first electronic device comprising a first power-on control unit and a first power-on detection unit;
 a second electronic device comprising a second power-on control unit and a second power-on detection unit; and
 a cable comprising:
  at least one information wiring coupled between the first electronic device and the second electronic device, the at least one information wiring being used for transmitting an information signal between the first electronic device and the second electronic device; and
  a signal level wiring, the signal level wiring being coupled to the first power-on control unit, the first power-on detection unit, the second power-on control unit and the second power-on detection unit respectively, the signal level wiring being used for providing a first reference level when the first electronic device and the second electronic device are both at a power-on state;
 wherein when the second electronic device is at a power-off state, the first power-on control unit of the first electronic device being used for sending a first power-on signal to the second power-on detection unit of the second electronic device through the signal level wiring, so as to turn on the second electronic device, on the other hand when the first electronic device is at the power-off state, the second power-on control unit of the second electronic device being used for sending a second power-on signal to the first power-on detection unit of the first electronic device through the signal level wiring, so as to turn on the first electronic device.

\* \* \* \* \*